(12) United States Patent
Jobe

(10) Patent No.: US 12,440,253 B2
(45) Date of Patent: Oct. 14, 2025

(54) BONE SCREW LOCKING RECEIVER AND BONE SCREW SYSTEM

(71) Applicant: MIRUS LLC, Marietta, GA (US)

(72) Inventor: Daniel Jobe, Marietta, GA (US)

(73) Assignee: MiRus LLC, Marietta, GA (US)

( * ) Notice: Subject to any disclaimer, the term of this patent is extended or adjusted under 35 U.S.C. 154(b) by 906 days.

(21) Appl. No.: 17/564,692

(22) Filed: Dec. 29, 2021

(65) Prior Publication Data

US 2022/0202455 A1 Jun. 30, 2022

Related U.S. Application Data

(60) Provisional application No. 63/132,714, filed on Dec. 31, 2020.

(51) Int. Cl.
*A61B 17/80* (2006.01)
*A61B 17/86* (2006.01)

(52) U.S. Cl.
CPC ...... *A61B 17/8057* (2013.01); *A61B 17/8605* (2013.01); *A61B 17/8033* (2013.01); *A61B 17/8038* (2013.01); *A61B 17/8042* (2013.01); *A61B 17/8047* (2013.01); *A61B 17/8052* (2013.01)

(58) Field of Classification Search
CPC . A61B 17/8057; A61B 17/80; A61B 17/8033; A61B 17/8038; A61B 17/8042; A61B 17/8047; A61B 17/8052; A61B 17/8605
USPC ......... 606/291, 280, 71, 286, 287, 288, 289, 606/290, 292, 86 R, 295, 296, 86 B, 915
See application file for complete search history.

(56) References Cited

U.S. PATENT DOCUMENTS

| | | | |
|---|---|---|---|
| 5,437,744 A * | 8/1995 | Carlen | C22C 27/04 148/423 |
| 6,974,461 B1 * | 12/2005 | Wolter | A61B 17/80 606/283 |
| 8,343,200 B2 | 1/2013 | Khanna et al. | |
| 8,906,076 B2 | 12/2014 | Mocanu et al. | |
| 9,247,975 B2 | 2/2016 | Erhart et al. | |
| 9,615,869 B2 | 4/2017 | Brown et al. | |
| 10,258,380 B2 | 4/2019 | Sinha | |
| 10,376,290 B2 | 8/2019 | Courtney et al. | |
| 10,441,334 B2 | 10/2019 | Horwitz | |

(Continued)

FOREIGN PATENT DOCUMENTS

WO WO-2020102179 A1 * 5/2020 ......... A61B 17/8057

*Primary Examiner* — Marcela I. Shirsat
(74) *Attorney, Agent, or Firm* — UB Greensfelder LLP; Brian E. Turung

(57) ABSTRACT

Various implementations described herein include a screw locking receiver. The screw locking receiver includes a receiver frame which has a first surface, a second surface opposite and spaced apart from the first surface, and an inner surface which extends between the first surface and the second surface. The receiver frame defines a cylindrical inner channel having a central axis. The receiver includes a counterbore which extends along a first portion of the inner surface. The receiver includes a plurality of threads extending helically about a second portion of the inner surface. The counterbore has a diameter that is sufficient to accept a screw head having a non-parallel central axis with respect to a central axis of the inner channel when in a fastened position.

30 Claims, 10 Drawing Sheets

(56) References Cited

U.S. PATENT DOCUMENTS

| | | | |
|---|---|---|---|
| 10,743,922 B1 | 8/2020 | Touchet et al. | |
| 2006/0009771 A1* | 1/2006 | Orbay | A61B 17/8061 606/291 |
| 2014/0142638 A1* | 5/2014 | Goodwin | A61B 17/8869 606/103 |
| 2014/0271029 A1* | 9/2014 | Arnett | A61B 17/86 411/259 |

* cited by examiner

BONE SCREW LOCKING RECEIVER AND BONE SCREW SYSTEM

CROSS-REFERENCE TO RELATED APPLICATIONS

This application claims the benefit of U.S. provisional patent application No. 63/132,714, filed on Dec. 31, 2020, and titled "BONE SCREW LOCKING RECEIVER AND BONE SCREW SYSTEM," the disclosure of which is expressly incorporated herein by reference in its entirety.

FIELD OF THE INVENTION

The present disclosure relates generally to bone fixation devices and more specifically to a bone screw locking receiver and bone screw system.

BACKGROUND OF THE INVENTION

Bone stabilization plates are often placed in patients when addressing fractures. The stabilization plates have holes designed to receive bone screws in applications where the bone screws need additional anchoring surfaces. Bone screw stabilization plates are often used, which have a plurality of holes to receive the bone screws to prevent the bone screws from disengaging and moving from the desired location.

Bone screws often include threads to guide and couple the bone screws. Some bone stabilization plate applications require the bone screw to be inserted on a longitudinal axis that is not aligned with the longitudinal axis of the hole in the stabilization plate. Inserting the bone screw in the stabilization plate hole where the longitudinal axis are at non-parallel angles can cause the stabilization plate to deform and cause the bone screw to not fit flush with the stabilization plate.

SUMMARY OF THE INVENTION

Bone screw locking receivers and bone screw systems are described herein. In some implementations, a counterbore and a counter-thread pattern are utilized in the bone screw locking receiver that provides a coupling interface for the bone screw. The bone screw locking receiver and bone screw provide a secure interference fit for the bone screw while limiting lateral deformation of the receiver when the bone screw is coupled to the receiver at a plurality of angles.

Various implementations described herein include a screw locking receiver. The screw locking receiver includes a receiver frame which has a first surface, a second surface opposite and spaced apart from the first surface, and an inner surface which extends between the first surface and the second surface. The receiver frame defines a cylindrical inner channel having a central axis. The receiver includes a counterbore which extends along a first portion of the inner surface. The receiver includes a plurality of threads extending helically about a second portion of the inner surface. The counterbore has a diameter that is sufficient to accept a screw head having a non-parallel central axis with respect to a central axis of the inner channel when in a fastened position. The diameter is sufficient to provide a flush surface between the first surface and a portion of the screw head furthest from the second surface when the screw is in a fastened position.

In some implementations, the counterbore is a cylindrical bore having a constant diameter. In some implementations, the first portion of the inner surface has a diameter that is about 10 percent larger than a diameter of the second portion of the inner surface.

In some implementations, the first portion of the inner surface has a diameter that is about 15 percent larger than a diameter of the second portion of the inner surface. In some implementations the first portion of the inner surface has a diameter that is about 20 percent larger than a diameter of the second portion of the inner surface.

In some implementations, the plurality of threads are etched into the inner surface of the receiver frame. In some implementations, the plurality of threads have a uniform helical pitch. In some implementations, at least one thread of the plurality of threads has a non-uniform helical pitch. In some implementations, the plurality of threads comprises two threads. In some implementations, the plurality of threads comprises three threads. In some implementations, the plurality of threads comprises four threads. In some implementations, leads of the plurality of threads are evenly spaced apart about the circumference of the inner surface of the receiver frame. In some implementations, leads of the plurality of threads are unevenly spaced apart about the circumference of the inner surface of the receiver frame. In some implementations, the locking receiver is composed of an alloy that includes Molybdenum, Titanium, Chromium, Cobalt, Nickel, Niobium, Tantalum, Rhenium, or combinations thereof. In some implementations, the locking receiver is composed of alloy that includes Molybdenum, Rhenium, and at least one of Cobalt, Chromium, Niobium, Tantalum, or Titanium. In some implementations, the alloy includes less than 50% Molybdenum by weight, less than 50% Rhenium by weight, and from 1% to 20% of at least one of Cobalt, Chromium, Niobium, Tantalum, or Titanium by weight.

In some implementations a land extends along at least a portion of the second portion of the inner surface, and wherein the land has a maximum thickness that is equal to an axial length of the counterbore. In some implementations the thickness of the land is between about 10 and 20 mil.

Various other implementations described herein include a bone screw system. The bone screw system includes a screw locking receiver according to any of the implementations described above. The system includes a bone screw. The bone screw includes a cylindrical section which has a first end, a second end, and a screw body. The screw body has an outer surface which extends between the first end and the second end, and a helical thread which extends axially about the outer surface of the screw body. The bone screw includes a head section having a first surface, a second surface which is opposite and spaced apart from the first surface, and an outer diameter. The second surface of the screw head is coupled to the first end of the cylindrical section of the screw. The screw locking receiver and the bone screw are configurable into a coupled position.

In some implementations, the cylindrical section of the bone screw is disposed at least partially in the cylindrical inner channel of the screw locking receiver when in the coupled position. In some implementations, at least a portion of the head section of the bone screw is at least partially disposed within the counterbore when in the coupled position. In some implementations, the threads of the bone screw are at least partially cross treaded with the plurality of threads of the screw locking receiver when in the coupled position. In some implementations, a portion of the first surface of the bone screw furthest away from the second surface of the screw locking receiver is flush with the first surface of the screw locking receiver. In some implementations, a central axis of the bone screw is not parallel with the central axis of the screw locking receiver.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
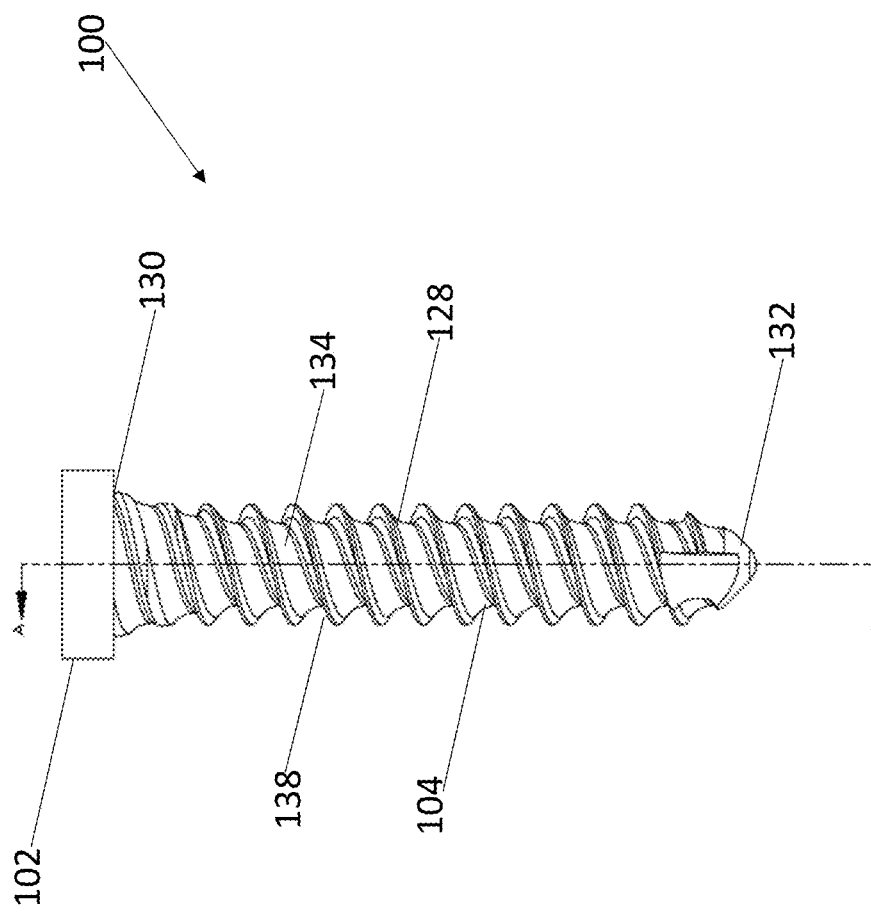
FIG. 1 is a side view of a bone screw coupled to a bone fixation locking plate in accordance with one or more implementations of the disclosure.
Figure 2:
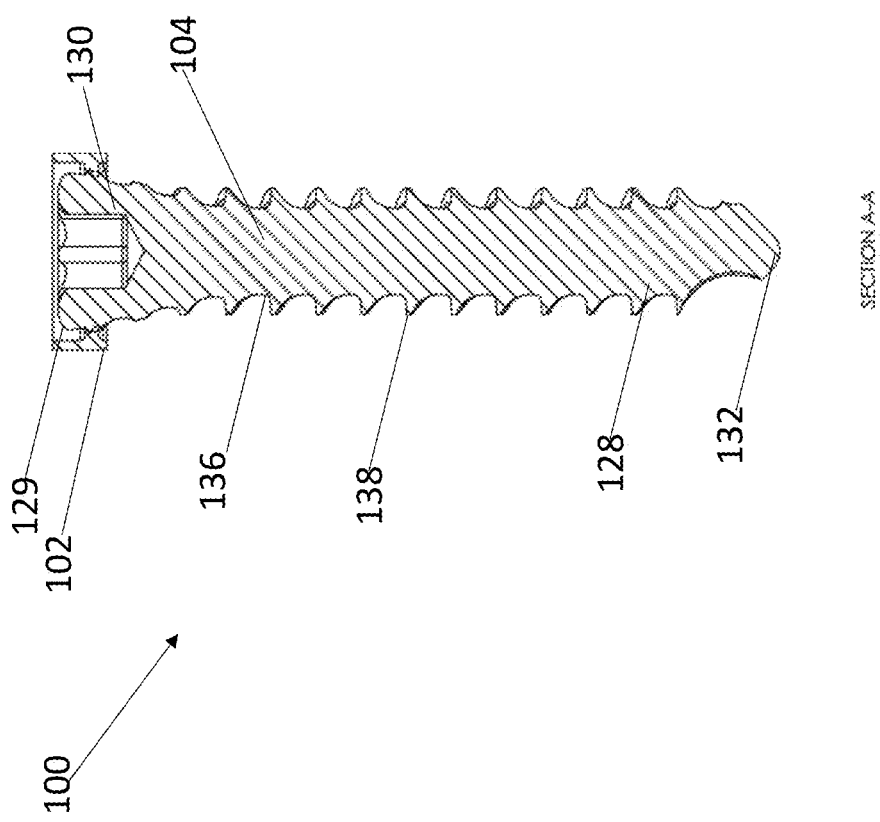
FIG. 2 is a cutaway side view of the bone screw coupled to the bone fixation locking plate as shown in FIG. 1, where the cutaway is taken is taken along line A-A.
Figure 3:
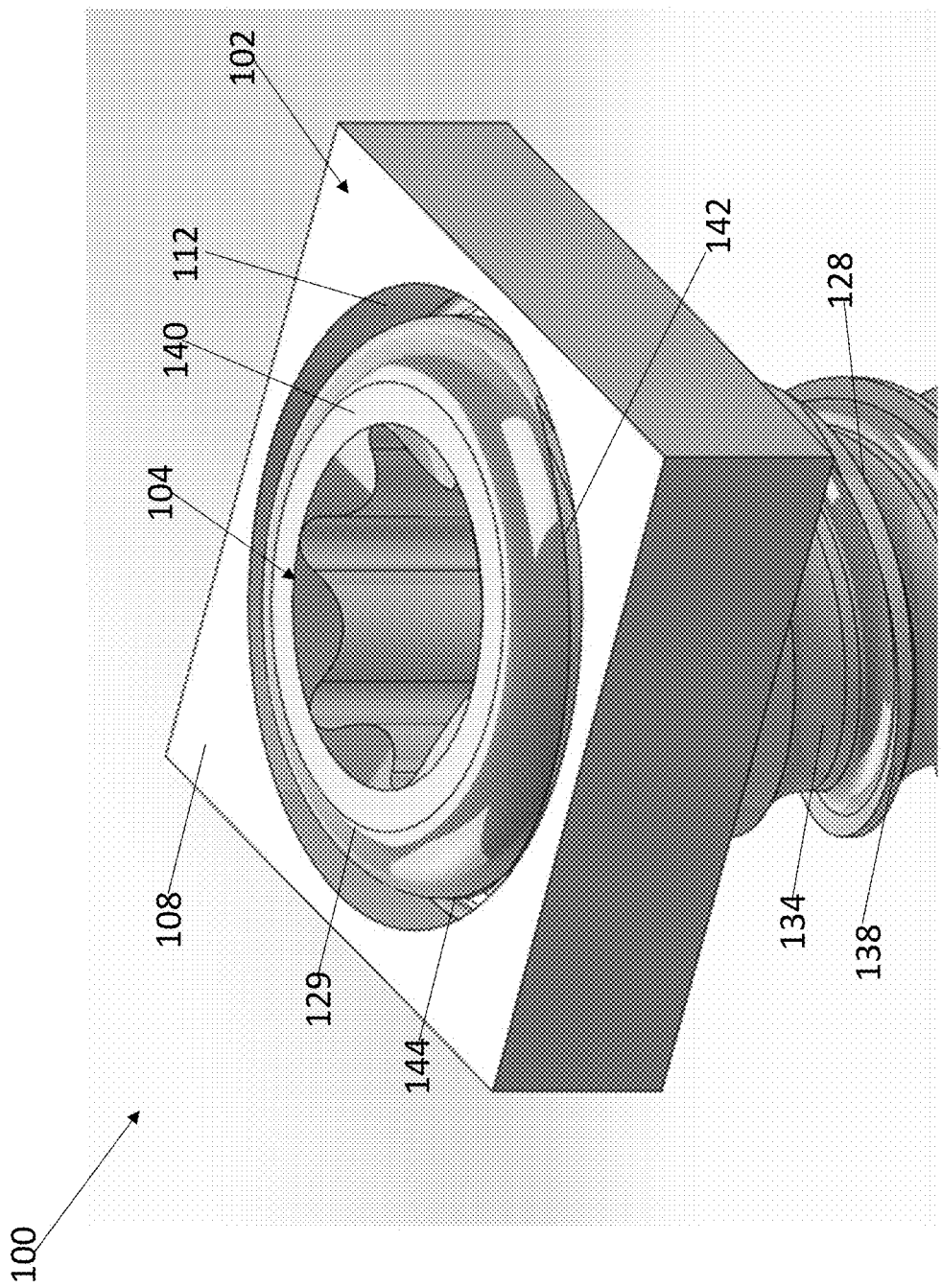
FIG. 3 is a detail perspective view of the locking screw shown in FIG. 1 coupled to the bone fixation locking plate as shown in shown in FIG. 1.
Figure 4:
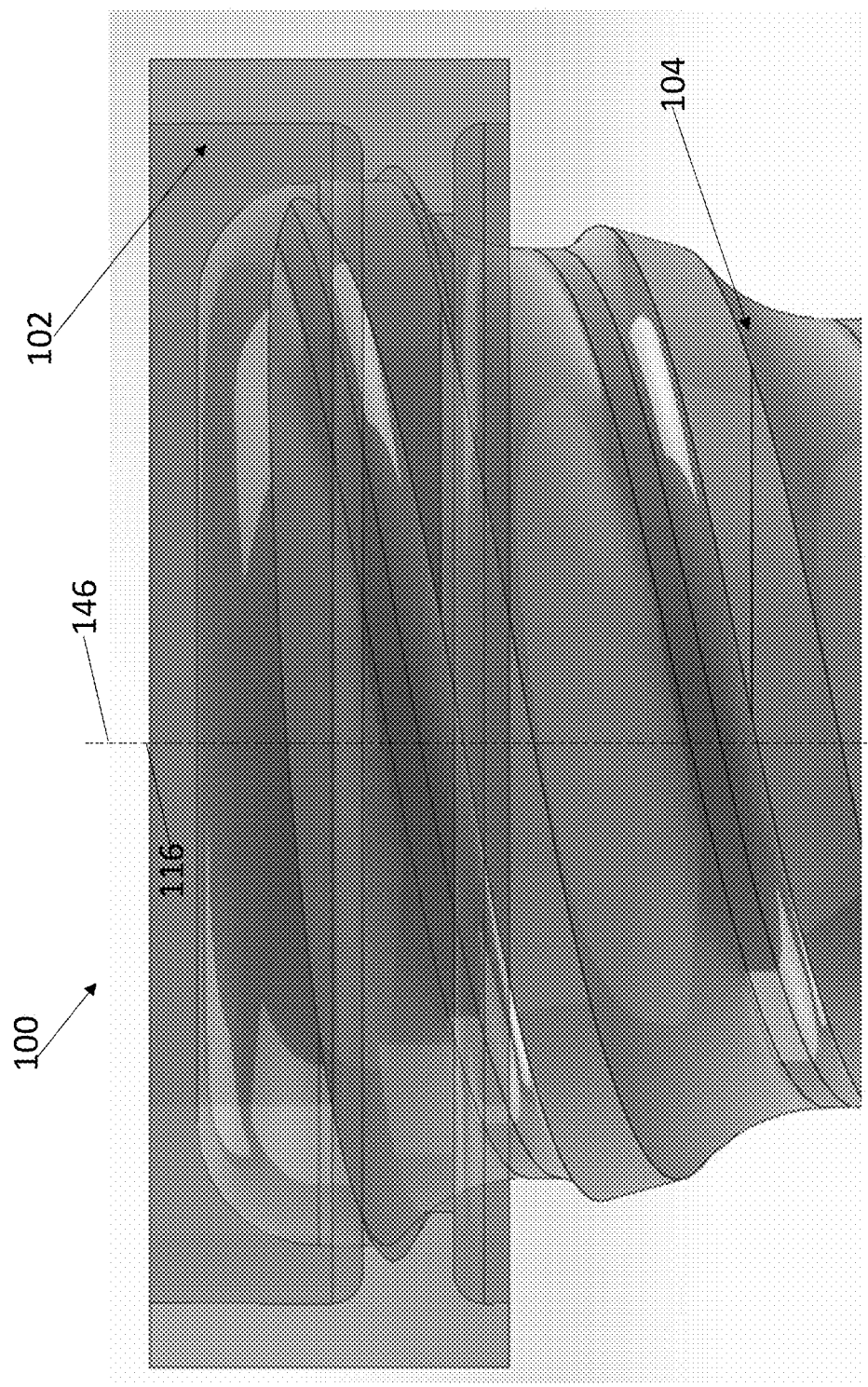
FIG. 4 is a detail transparent side view of the bone screw coupled to the bone fixation locking plate as shown in FIG. 1 where the bone screw and the bone fixation locking plate have coaxial central axes.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Implementations of bone screw locking receivers and bone screw locking systems are provided herein. The bone screw locking system includes a bone screw locking receiver that has a counterbore, and a bone screw that is couplable to the bone screw locking receiver. The apparatuses and systems described herein provide mechanisms to securely couple a bone screw to a receiver at an angle where a central axis of the bone screw is either parallel or non-parallel with a longitudinal axis of the receiver. By including a counterbore in the receiver, the receiver provides a lateral cavity for the bone screw to rotate off axis, which limits deformation of the receiver. The receiver can be placed in a patient during an operation to secure the bone screw. During an operation the receiver is placed in a patent, adjacent to a desired bone structure. The bone screw is advanced into the desired patient location and into the receiver. In applications where the bone screw is inserted at an angle having a central axis different than the central axis of the receiver (non-parallel axes), the bone screw can be advanced into the receiver such that a flush surface is formed on a first side of the receiver furthest away from a second end of the bone screw (described below). A plurality of helical threads is also provided in the receiver in addition to the counterbore. The helical threads give additional surface interface for the bone screw to engage and securely couple to the receiver.

FIGS. 1-6 show a bone screw system 100. The bone screw system 100 includes a bone screw locking receiver 102 as shown in FIGS. 1-10 and a bone screw 104.

As shown in FIGS. 1-10, the bone screw locking receiver 102 includes a receiver frame 106 having a first surface 108 and a second surface 110 opposite and spaced apart from the first surface 108. The receiver frame 106 has a square shaped axial cross section such that outer edges of the receiver 102 form a square outer profile. The receiver 102 also includes an inner surface 112 which extends between the first surface 108 and the second surface 110 and defines a cylindrical inner channel 114 having a central axis 116. The central axis 116 of the inner channel 114 extends through a center point of the receiver 102 such that the inner channel 114 extends centrally through the receiver 102.

The receiver 102 includes a counterbore 118 which extends along a first portion 120 of the inner surface 112. The counterbore 118 is a cylindrical bore that forms an inner diameter in the inner channel 114 (e.g., the portion along the first portion 120 of the inner surface 112) that is larger than the diameter of the other portions of the inner channel 114 (e.g., the portion along a second portion 124 of the inner surface 112). The first portion 120 extends from the first surface 108 into the inner channel 114 by an axial length of 0.035 inches. The counterbore 118 has a constant diameter along its axial length, such that the counterbore 118 is a uniform cylindrical shape. In the example shown in FIGS. 1-10, the diameter of the counterbore 118 is 10 percent larger than the diameter of the second portion 124 (described below). The counterbore 118 has a diameter of 0.195 inches. The receiver 102 also includes a second counterbore 119 that is shaped similarly to the counterbore 118 described above and extends from the second surface 110 of the receiver into the second portion 124 of the inner surface 112. The second counterbore 119 has a diameter of 0.195 inches and has an axial length that is less than the axial length of the first counterbore 118.

The receiver 102 as shown in FIGS. 1-10 includes two threads 122 extending helically about the second portion 124 of the inner surface 112 adjacent the first portion 120 of the receiver 102. The threads 122 are embedded in the inner surface 112 and extend helically along the central axis 116 of the inner channel 114. The threads 122 have a uniform helical pitch, such that each of the two threads 122 have a constant pitch that extends along the axial length of the second portion 124. The threads 122 have a pitch of 2 mm. The threads 122 have leads 126 which abut the counterbore 118. The leads are circumferentially offset from each other about the inner surface 112 of the receiver 102. This circumferential offset provides additional points of engagement for a bone screw 104 and provides a counter thread structure for securely engaging a bone screw 104. The threads 122 are circumferentially offset by 180 degrees to guide a bone screw entering at a plurality of rotational positions. The receiver 102 includes a land 121 adjacent the threads 122 that extends along at least a portion of the second portion 124 of the inner surface 112. The land 121 has a maximum thickness that is equal to an axial length of the counterbore 118 and provides a transition surface between the first portion 120 and the second portion 124. The receiver 102 is optionally formed from an alloy having a constituent of molybdenum, titanium, chromium, cobalt, nickel, niobium, tantalum, or rhenium in some implementations. For example, in some implementations, the receiver 102 is optionally formed from an alloy having a primary constituent of molybdenum and/or rhenium. Optionally, in some implementations, the receiver is formed from an alloy that is composed of molybdenum, rhenium, and at least one of cobalt, chromium, niobium, tantalum, or titanium. Optionally, the alloy can be composed of less than 50% molybdenum by weight, less than 50% rhenium by weight, and from 1 to 20% of at least one of cobalt, chromium, niobium, tantalum, or titanium by weight. It should be understood that the receiver 102 can be made from other suitable materials. Additionally, this disclosure contemplates that the receiver 102 can be manufactured by molding, machining, additive manufacturing or any other method of manufacturing suitable for forming a bone screw receiver.

In the example shown in FIGS. 1-10 the receiver frame 106 is square shaped, but in other implementations, the receiver frame is circular, rectangular, or any other shape suitable for securing a bone screw 104 in a patient's bone structure. In the example shown in FIGS. 1-10, the first and second counterbore 118, 119 each have a diameter of 0.195 inches, but in other implementations the first and second counterbore each have a diameter between 0.185 inches and 0.205 inches or any other diameter suitable for accepting an off-axis bone screw 104. In the example shown in FIGS. 1-10 the cylindrical inner channel 114 has a counterbore 118 that extends centrally through the receiver frame 106. But in other implementations, the inner channel 114 extends through the receiver frame 106 at a non-central location. In the example shown in FIGS. 1-10, the first portion 120 extends from the first surface 108 into the inner channel 114 by an axial length of 0.035 inches. But in other implementations, the first portion 120 extends into the inner channel 114 by an axial length between 0.030 inches and 0.050 inches or any other axial length suitable to secure a bone screw and limit axially perpendicular deformation in the case of off axis bone screw insertion. In the example shown in FIGS. 1-10 the diameter of the counterbore is 10 percent larger than the diameter of the second portion 126 of the inner surface 112. But in other implementations, the counterbore is about 15 percent larger than the second section, 20 percent larger than the second section, or any other percentage larger than the second section suitable to secure a bone screw and limit axially perpendicular deformation in the case of off axis bone screw insertion. In the example shown in FIGS. 1-10, the receiver 102 includes the counterbore 118 and the second counterbore 119 as shown in the example shown in FIGS. 2, 4-6, 7, and 9. But in some implementations, the receiver only includes the counterbore 118 and does not include the second counterbore 119. The second counterbore 119 in the example shown in FIGS. 1-10 has an axial length that is less than the axial length of the counterbore 118, but in other implementations the second counterbore 119 has an axial length that is greater than or equal to the axial length of the counterbore 118. In the example shown in FIGS. 1-10 the receiver 102 has two screw threads 122, but in other implementations the receiver 102 has three screw threads, four screw threads, or any other plurality of screw threads suitable for forming counter screw threads in an inner diameter of a channel 114. In the example shown in FIGS. 1-10 the screw threads have a pitch of 2 mm, but in other implementations the threads 122 have a pitch between 1-3 mm, or any other pitch suitable for engaging a bone screw. In the example shown in FIGS. 1-10, the threads 122 have a uniform helical pitch. But in other implementations, the threads have a non-uniform helical pitch such that at least one of the threads has a pitch that extends at a varying pitch along the axial length of the second portion 126.

In the example shown in FIGS. 1-10, the threads 122 have leads 126 that are circumferentially spaced apart from each other about the inner surface 112 of the receiver 102 by 180 degrees. But in other implementations, they are spaced apart by is 90 degrees, 270 degrees or any other angle that is suitable for engaging a bone screw with a counter screw thread pattern. In some implementations the leads 126 are spaced apart evenly about the circumference of the inner diameter. But in other implementations, the leads 126 are unevenly spaced apart about the circumference of the inner diameter. In the example shown in FIGS. 1-10, the receiver 102 has two leads 126. But in other implementations, the receiver has three leads, four leads, or any other number of leads suitable for accepting and securing a bone screw at a plurality of angles. In the example shown in FIGS. 1-10 the land 121 has a thickness of 10 millionths of an inch. But in some implementations, the thickness of the land is any thickness between about 10 and 20 mil. The receiver 102 is formed from molybdenum-titanium alloy in some implementations. But in other implementations, the receiver is formed from molybdenum-rhenium; titanium such as titanium-6Al-4V; alloy having a primary constituent of molybdenum, titanium, chromium, cobalt, or nickel; or any other material suitable for forming a bone screw receiver. In some implementations, the receiver 102 is coupled to a plurality of other receivers to form a bone stabilization plate (not shown). The cross sections can be coupled together along their edges such that a first surface and a second surface of each receiver is coplanar, and the inner channels of each receiver are axially parallel.

FIGS. 1-6 show the bone screw 104. The bone screw 104 is structured to engage with the bone structure of a patient and secure or fasten the bones in a desired position with respect to the receiver 102. The bone screw 104 includes a cylindrical section 128 and a head section 129. The cylindrical section 128 has a first end 130, a second end 132, and a screw body 134. The bone screw 104 has a central axis 146 that extends through the cylindrical section 128 and the head section 129. The screw body 134 has an outer surface 136 which extends between the first end 130 and the second end 132. The cylindrical section 128 has an outer diameter of 3.5 mm. The bone screw 104 also includes a helical thread 138 which extends axially about the outer surface 136 of the screw body 134. The helical thread 138 has a constant pitch that provides an interface to engage with the desired bone segment and the receiver 102. The head section 129 has a first surface 140, a second surface 142 which is opposite and spaced apart from the first surface 140 and disposed at a transition angle configured to smoothly connect to the to the cylindrical section 128, and an outer diameter 144. The outer diameter 144 of the head section 129 is 0.182 inches. The head section 129 provides an interface for a physician or technician to manipulate the bone screw 104 during an operation and secure the bone screw 104 in a desired position. The head section 129 defines an internal cavity 131 that is provides an interface to accept a manipulation tool such as a drill bit for tightening. Although the cylindrical section 128 in the example shown in FIGS. 1-6 has an outer diameter of 3.5 mm, in other implementations, the cylindrical section 128 has an outer diameter between about 2.5 mm and 4 mm, or any other diameter suitable for a bone screw cylinder. Although the head section 129 in the example shown in FIGS. 1-6 has a diameter of 0.182 inches, in other implementations, the head section 129 has an outer diameter between about 0.175 mm and 0.185 mm, or any other diameter suitable for a bone screw cylinder.

As described above, FIGS. 1-6 show the bone screw 104 engaged with the receiver 102 in a coupled position where a portion of the cylindrical section 128 is disposed in the inner channel 114. The helical thread 138 engages with the threads 122 when in the coupled position. One of the two threads 122 guide the bone screw 104 into position and the counter thread provides a securing frictional surface for the bone screw 104. The head section 129 is disposed within the counterbore 118 such that the first surface 140 of the head section 129 is coplanar with the first surface 108 of the receiver 104 as shown in FIGS. 1-4 and 6.

Figure 5:
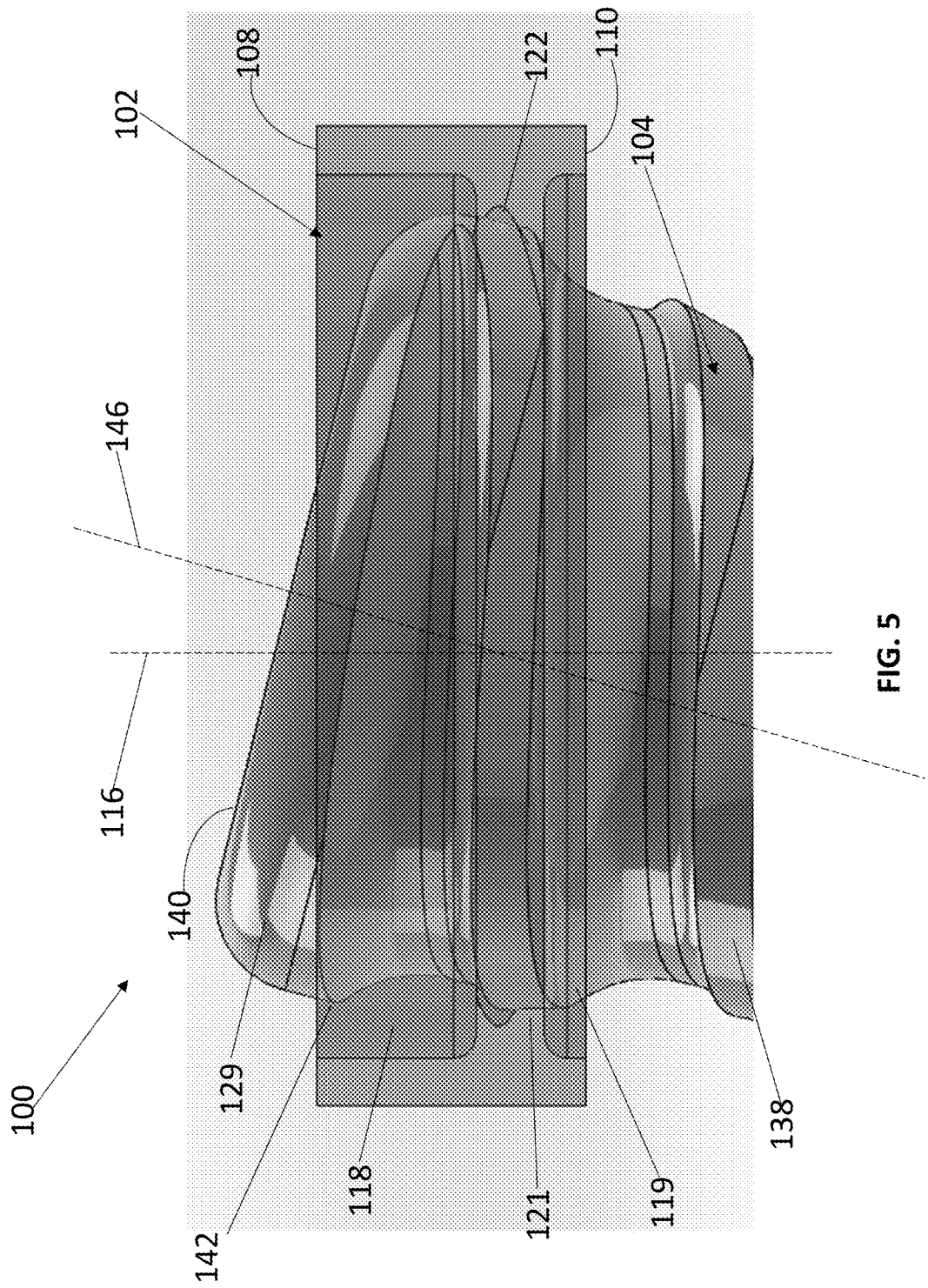
FIG. 5 is a detail transparent side view of the bone screw coupled to the bone fixation locking plate as shown in FIG. 1 where the bone screw and the bone fixation locking plate having central axes that are not coaxial.
Figure 6:
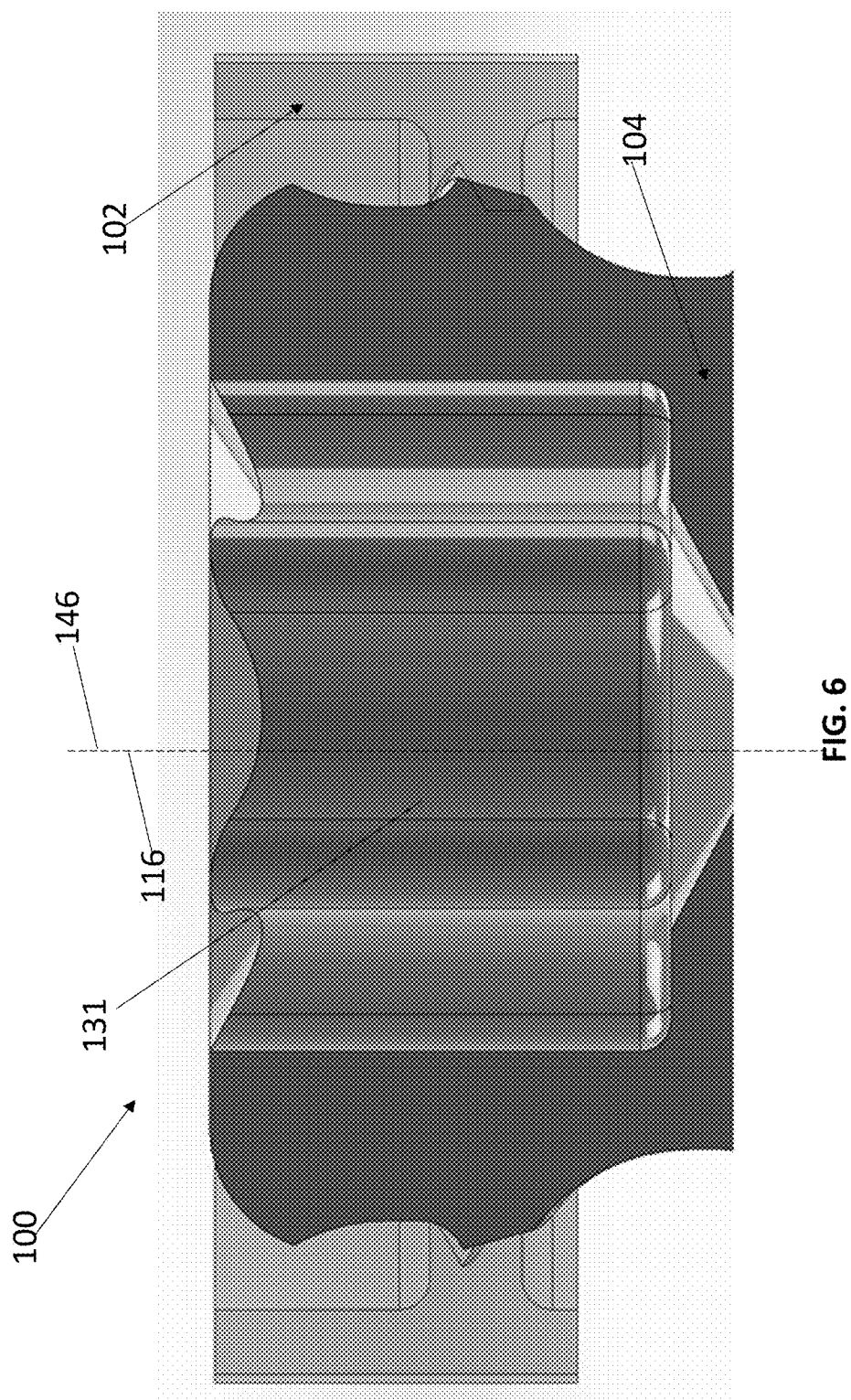
FIG. 6 is detail cutaway side view of the bone screw coupled to the bone fixation locking plate shown in FIG. 1, where the cutaway is taken is taken along line A-A.
Figure 7:
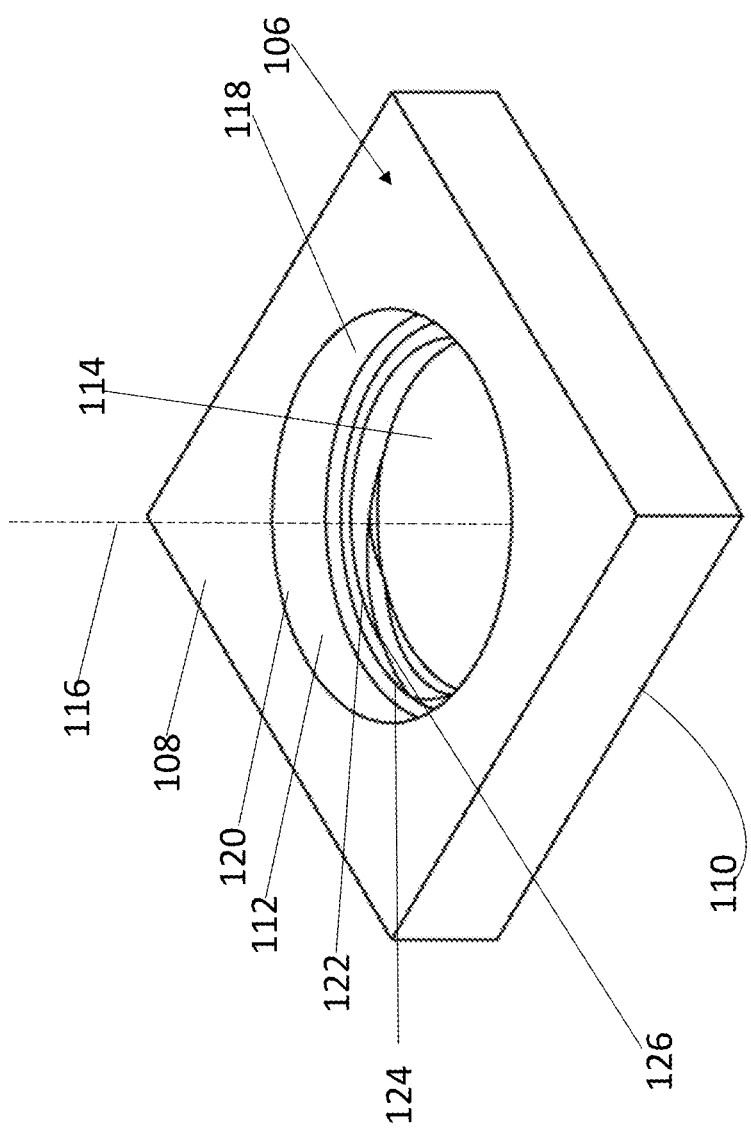
FIG. 7 is a perspective view of a bone fixation locking plate in accordance with one or more implementations of the disclosure.
Figure 8:
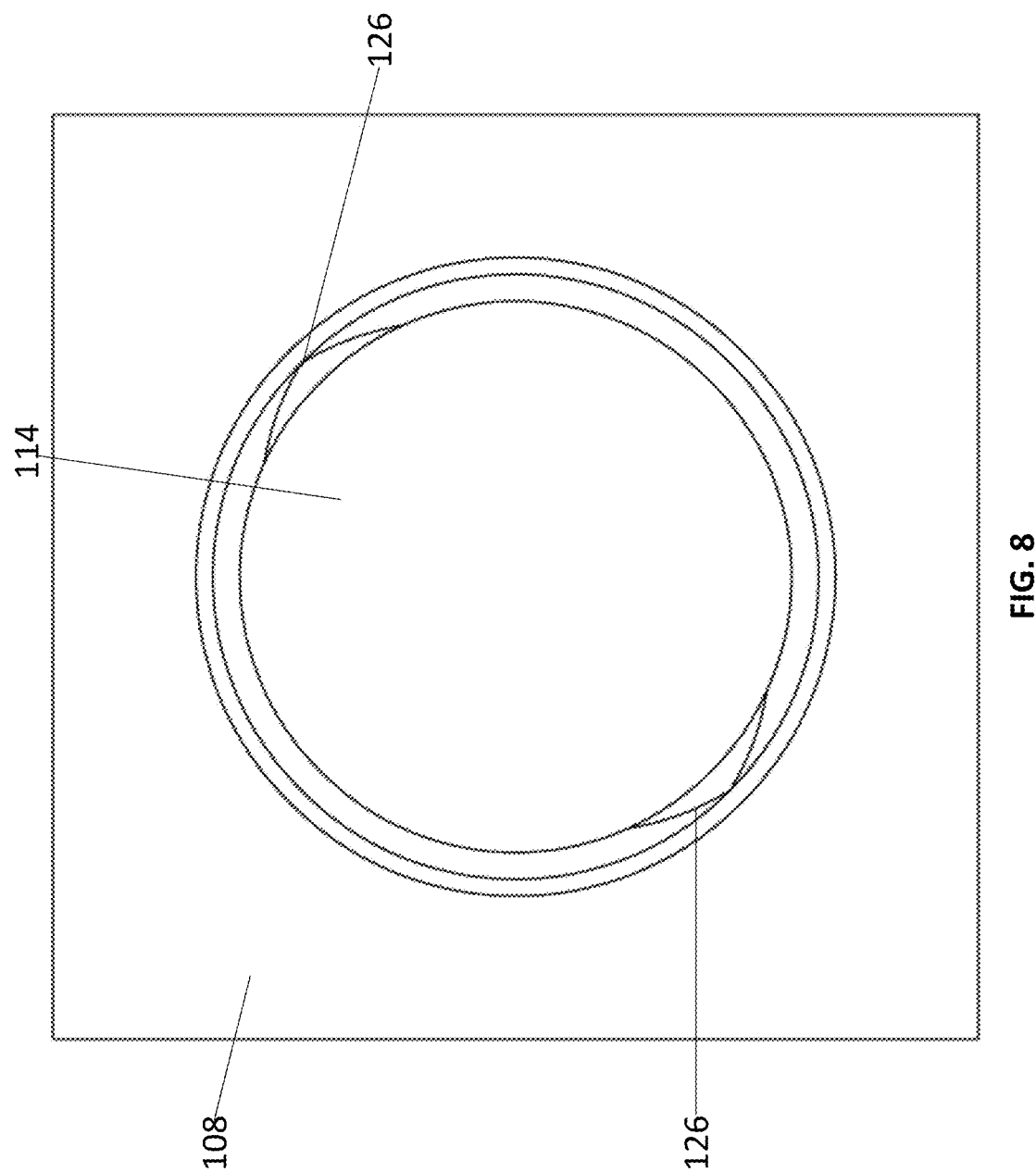
FIG. 8 is a top view of the bone fixation locking plate shown in FIG. 7.
Figure 9:
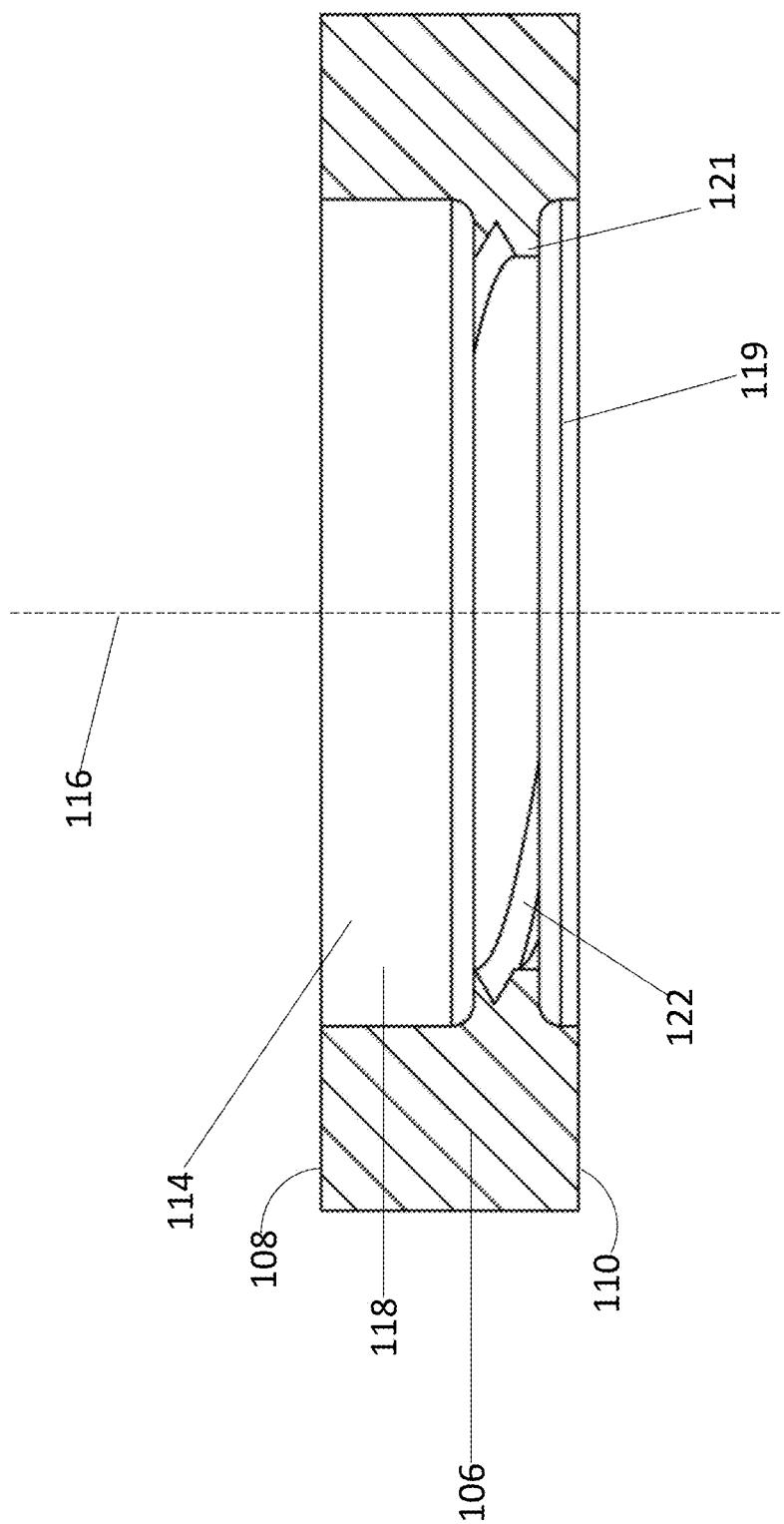
FIG. 9 is a cutaway side view of the bone fixation locking plate shown in FIG. 7, where the cutaway is taken is taken along line A-A shown in FIG. 10.
Figure 10:
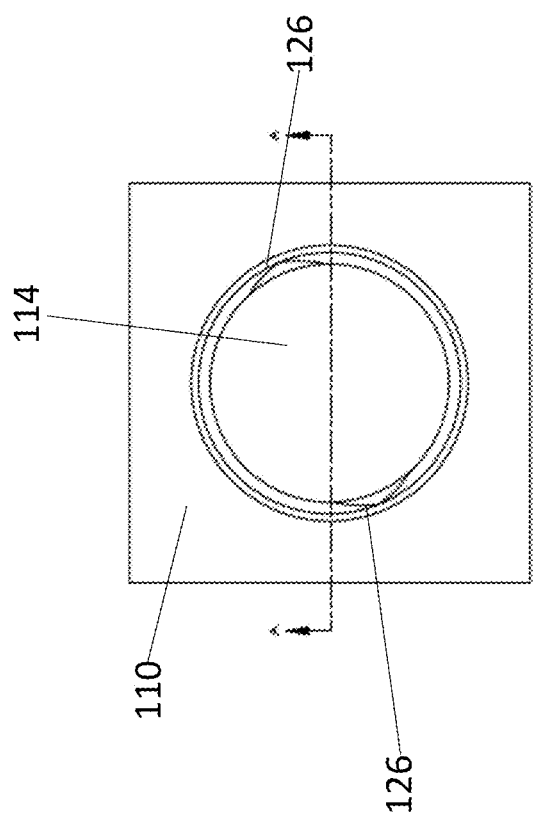
FIG. 10 is a bottom view of the bone fixation locking plate shown in FIG. 7.

As shown in FIG. 5, the bone screw 104 can also be in a coupled position where the central axis 116 of the receiver 102 is not parallel with the central axis 146 of the bone screw 104. In this orientation the helical thread 138 is cross threaded with both of the threads 122. This provides an additional frictional surface and interference fit for the bone screw 104 to couple the bone screw in a fixed position. The bone screw head 129 is received in the counterbore 118 and partially embeds into the receiver 102 such that no part of the bone screw 104 protrudes beyond the counterbore in a direction past the first surface 108 of the receiver 102. As such, the portion of the first surface 140 of the bone screw 104 furthest away from the second surface 110 of the screw locking receiver 102 is flush with the first surface 108 of the screw locking receiver 102. Further, the counterbore 118 provides axial space for the screw head 129 of the bone screw 104 to be placed and limits deformation of the receiver 102 in a direction perpendicular to the longitudinal axis of the receiver 102.

Although shown and described is what is believed to be the most practical and preferred implementations, it is apparent that departures from specific designs and methods described and shown will suggest themselves to those skilled in the art and may be used without departing from the spirit and scope of the invention. The present invention is not restricted to the particular constructions described and illustrated but should be constructed to cohere with all modifications that may fall within the scope of the appended claims.

What is claimed is:

1. A screw locking receiver comprising:
a receiver frame having a first surface, a second surface opposite and spaced apart from the first surface, and an inner surface which extends between the first surface and the second surface and defines a cylindrical inner channel having a central axis;
wherein a cylindrically shaped top counterbore extends along a first portion of the inner surface and has a uniform diameter along a majority of the longitudinal length of the top counterbore; the top counterbore has a top opening that extends to the first surface; a bottom surface of the top counterbore is spaced upwardly from the second surface;
wherein a threaded region that extends helically about at least a portion of a second portion of the inner surface; a top of the threaded region terminates at the bottom surface of the top counterbore;
wherein said diameter of the top counterbore is sufficient to accept a screw head having a non-parallel central axis with respect to the central axis of the inner channel when in a fastened position;
a maximum diameter of the threaded portion is less than the diameter of the top counterbore;
wherein a depth of the top counterbore is sufficient to a) provide a flush surface between the first surface and a top portion of the screw head that is positioned furthest from the second surface when the screw is in the fastened position and a longitudinal axis is parallel to a central axis of the top counterbore, or b) a top portion of the screw is spaced downwardly from the first surface when the screw is in the fastened position and a longitudinal axis is parallel to a central axis of the top counterbore;
wherein the threaded region includes first and second threads; the first and second threads are each helically shaped; the first and second threads are spaced from one another; a lead of each of the first and second threads starts at the top of the threaded region; the lead of the first and second threads are spaced from one another; and
wherein said lead on said first and second threads are positioned diametrically apart from one another about said inner surface.

2. The screw locking receiver of claim 1, wherein the receiver frame includes a bottom counterbore in a bottom portion of the second portion of the inner surface; a bottom of the bottom counterbore extends to the second surface; a bottom of the threaded region terminates at a top of the bottom counterbore; a bottom portion of the bottom counterbore has a diameter that is the same as the diameter of the top counterbore at a top portion of the top counterbore; the maximum diameter of the threaded portion is less than the diameter of the bottom portion of the bottom counterbore.

3. The screw locking receiver of claim 1, wherein the first portion of the inner surface has a diameter that is about 10 percent larger than a diameter of the second portion of the inner surface.

4. The screw locking receiver of claim 1, wherein the first portion of the inner surface has a diameter that is about 15 percent larger than a diameter of the second portion of the inner surface.

5. The screw locking receiver of claim 1, wherein the first portion of the inner surface has a diameter that is about 20 percent larger than a diameter of the second portion of the inner surface.

6. The screw locking receiver of claim 1, wherein the threaded region is etched into the inner surface of the receiver frame.

7. The screw locking receiver of claim 1, wherein the threaded region includes a plurality of helically shaped threads that have a uniform helical pitch.

8. The screw locking receiver of claim 1, wherein the threaded region includes a plurality of helically shaped threads and wherein at least one thread of the plurality of threads has a non-uniform helical pitch.

9. The screw locking receiver of claim 1, wherein the threaded region includes first, second and third threads; the first, second and third threads are each helically shaped; the first, second and third threads are spaced from one another.

10. The screw locking receiver of claim 1, wherein the threaded region includes first, second, third and fourth threads; the first, second, third and fourth threads are each helically shaped; the first, second, third and fourth threads are spaced from one another.

11. The screw locking receiver of claim 1, wherein respective leads of the plurality of threads are evenly spaced apart about the top of the inner surface of the receiver frame.

12. The screw locking receiver of claim 1, wherein respective leads of the plurality of threads are unevenly spaced apart about the top of the inner surface of the receiver frame.

13. The screw locking receiver of claim 1, wherein the screw locking receiver is composed of alloy that comprises Molybdenum, Titanium, Chromium, Cobalt, Nickel, Niobium, Tantalum, or Rhenium.

14. The screw locking receiver of claim 1, wherein the screw locking receiver is composed of alloy that comprises Molybdenum and Rhenium, and at least one of Cobalt, Chromium, Niobium, Tantalum, or Titanium.

15. The screw locking receiver of claim 14, wherein the alloy comprises less than 50% Molybdenum by weight, less than 50% Rhenium by weight, and from 1% to 20% of at least one of Cobalt, Chromium, Niobium, Tantalum, or Titanium by weight.

16. The screw locking receiver of claim 1, wherein a land extends along at least a portion of the second portion of the inner surface, and wherein the land has a maximum thickness that is equal to an axial length of the counterbore.

17. The screw locking receiver of claim 1, wherein a land extends along at least a portion of a bottom portion of the second portion of the inner surface; at least a portion of the land is positioned between the second surface and the threaded region.

18. A screw locking receiver comprising:
a receiver frame having a first surface, a second surface opposite and spaced apart from the first surface, and an inner surface which extends between the first surface and the second surface and defines a cylindrical inner channel having a central axis;
a first counterbore that extends downwardly from said first surface of said receiver frame to a top portion of said inner surface;
a second counterbore that extends upwardly from said second surface of said received frame to a second portion of said inner surface; and,
a threaded portion that is positioned between said first and second counter bores; said threaded portion includes first and second threads; each of said first and second threads extending helically about an intermediate portion of said inner surface each of said first and second threads includes a lead; each of said lead of said first and second thread is located at a top of said threaded portion; said first and second threads are spaced from one another; said lead on said first and second threads are spaced from one another; said lead on said first and second threads are positioned diametrically apart from one another about said inner surface.

19. The screw locking receiver as defined in claim 18, wherein said first counterbore and said second counterbore have a constant cross-sectional shape and cross-sectional size along said central axis.

20. The screw locking receiver as defined in claim 19, wherein said first counterbore and said second counterbore have a circular constant cross-sectional shape.

21. The screw locking receiver as defined in claim 20, wherein a) said first counterbore has a maximum cross-sectional size that is greater than a maximum cross-sectional size of said threaded portion, and/or b) said second counterbore has a maximum cross-sectional size that is greater than a maximum cross-sectional size of said threaded portion.

22. The screw locking receiver as defined in claim 21, wherein said lead on said first and second threads are positioned nondiametrically apart from one another about said inner surface.

23. The screw locking receiver as defined in claim 22, wherein said screw locking receiver is at least partially formed alloy that that includes one or more metals selected from the group consisting of Molybdenum, Titanium, Chromium, Cobalt, Nickel, Niobium, Tantalum, and Rhenium.

24. The screw locking receiver as defined in claim 23, wherein said inner surface includes a land; at least a portion of said land is positioned between said threaded portion and said second surface; a maximum width of said land is less than a maximum width of said second counterbore.

25. The screw locking receiver as defined in claim 24, wherein said first counterbore has a shape configured to a) accept a screw head having a non-parallel central axis with respect to said central axis of said inner channel when in a fastened position, and/or b) provide a flush surface between said first surface and a portion of said screw head furthest from said second surface when in a fastened position.

26. The screw locking receiver as defined in claim 18, wherein a) said first counterbore has a maximum cross-sectional size that is greater than a maximum cross-sectional size of said threaded portion, and/or b) said second counterbore has a maximum cross-sectional size that is greater than a maximum cross-sectional size of said threaded portion.

27. The screw locking receiver as defined in claim 18, wherein said lead on said first and second threads are positioned nondiametrically apart from one another about said inner surface.

28. The screw locking receiver as defined in claim 18, wherein said screw locking receiver is at least partially formed alloy that includes one or more metals selected from the group consisting of Molybdenum, Titanium, Chromium, Cobalt, Nickel, Niobium, Tantalum, and Rhenium.

29. The screw locking receiver as defined in claim 18, wherein said inner surface includes a land; at least a portion of said land is positioned between said threaded portion and said second surface; a maximum width of said land is less than a maximum width of said second counterbore.

30. The screw locking receiver as defined in claim 18, wherein said first counterbore has a shape configured to a) accept a screw head having a non-parallel central axis with respect to said central axis of said inner channel when in a fastened position, and/or b) provide a flush surface between said first surface and a portion of said screw head furthest from said second surface when in a fastened position.

* * * * *